US010669998B2

(12) United States Patent
Stevens

(10) Patent No.: US 10,669,998 B2
(45) Date of Patent: Jun. 2, 2020

(54) ELECTRIC ENERGY GENERATION AND STORAGE SYSTEM FOR AQUATIC AND SUBAQUATIC ENVIRONMENT

(71) Applicant: Christophe Stevens, Charroux (FR)

(72) Inventor: Christophe Stevens, Charroux (FR)

( * ) Notice: Subject to any disclaimer, the term of this patent is extended or adjusted under 35 U.S.C. 154(b) by 0 days.

(21) Appl. No.: 15/769,310

(22) PCT Filed: Oct. 19, 2016

(86) PCT No.: PCT/EP2016/075101
§ 371 (c)(1),
(2) Date: Apr. 18, 2018

(87) PCT Pub. No.: WO2017/067987
PCT Pub. Date: Apr. 27, 2017

(65) Prior Publication Data
US 2018/0313339 A1 Nov. 1, 2018

(30) Foreign Application Priority Data

Oct. 19, 2015 (FR) ...................................... 15 02200

(51) Int. Cl.
*F03G 3/00* (2006.01)
*B63B 35/44* (2006.01)
(52) U.S. Cl.
CPC ................ *F03G 3/00* (2013.01); *B63B 35/44* (2013.01); *B63B 2035/4466* (2013.01); *F03G 2730/00* (2013.01)
(58) Field of Classification Search
CPC ................... F03G 3/00; F03G 2730/00; B63B 2035/4466; B63B 35/44; H02K 7/1853; H02K 7/1004
See application file for complete search history.

(56) References Cited

U.S. PATENT DOCUMENTS

2006/0017292 A1 * 1/2006 Matsubara ............ F03B 17/025
290/43
2008/0295526 A1 * 12/2008 Boatman ................. B63B 21/50
62/50.1
(Continued)

FOREIGN PATENT DOCUMENTS

CN 103867409 A 6/2014
DK 201470776 A1 * 6/2016 ........... F03D 7/0228
(Continued)

*Primary Examiner* — Sean Gugger
(74) *Attorney, Agent, or Firm* — Harness, Dickey & Pierce, P.L.C.

(57) ABSTRACT

A system, for storing and generating electrical energy in an aquatic environment, comprising:
a plurality of weights (135) attached to an underwater PAP platform (131) positioned at a sufficient depth to avoid surface currents and the effects of bad weather.
a generator lift (100), arranged to cooperate with the weights (135) and, in generation mode, to allow said weights to descend to the bottom zone (126) and, in drive mode, to raise them back up towards the surface (125);
a main underwater platform which is positioned at a sufficient depth to avoid surface currents and the effects of bad weather (101) and is capable of supporting the upper portion of the generator lift (100) below the surface;
a reversible motor (102), cooperating with the generator lift (100) and allowing, in generation mode, the production of electrical energy due to the action of the weights (135) as they descend, and, in drive mode, actuation of the generator lift (100) to raise the weights (135) back up.

20 Claims, 22 Drawing Sheets

(56) References Cited

U.S. PATENT DOCUMENTS

| | | | |
|---|---|---|---|
| 2009/0193808 A1* | 8/2009 | Fiske | F03G 3/00 |
| | | | 60/721 |
| 2010/0107627 A1* | 5/2010 | Morgan | B63B 35/44 |
| | | | 60/495 |
| 2010/0135728 A1* | 6/2010 | Nadarajah | B63B 35/44 |
| | | | 405/208 |
| 2010/0283250 A1* | 11/2010 | Capone | F03B 17/066 |
| | | | 290/54 |
| 2012/0112472 A1* | 5/2012 | Murray | H02J 15/003 |
| | | | 290/1 R |
| 2014/0361542 A1 | 12/2014 | Ham | |
| 2016/0040645 A1* | 2/2016 | Perez | F03B 13/00 |
| | | | 290/45 |
| 2016/0344259 A1* | 11/2016 | Stevens | F03B 17/02 |
| 2017/0321653 A1* | 11/2017 | Rebsdorf | F03D 7/0228 |

FOREIGN PATENT DOCUMENTS

| | | |
|---|---|---|
| WO | WO 2014/160522 A1 | 10/2014 |
| WO | WO 2015/114440 A1 | 8/2015 |

* cited by examiner

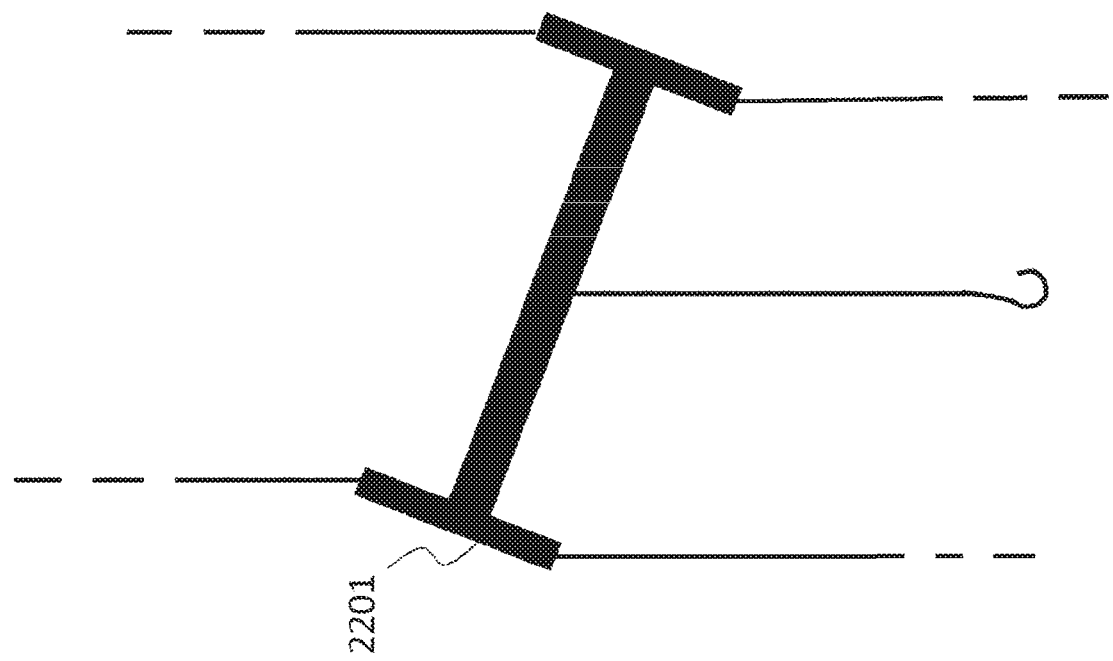
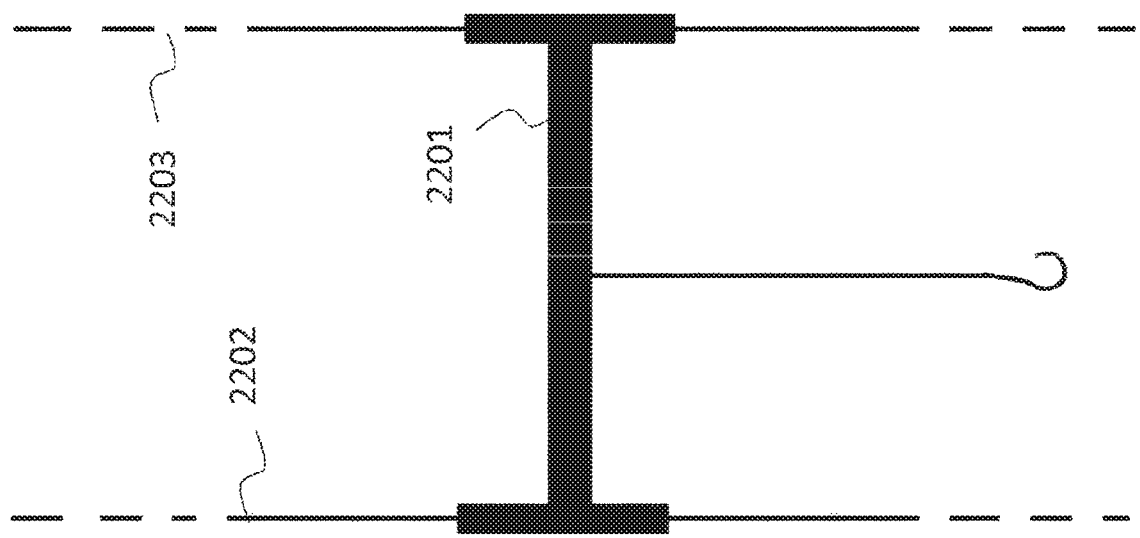
FIG. 22

ELECTRIC ENERGY GENERATION AND STORAGE SYSTEM FOR AQUATIC AND SUBAQUATIC ENVIRONMENT

CROSS-REFERENCE TO RELATED APPLICATION

This application is a U.S. National Stage of International Application No. PCT/EP2016/075101, filed on Oct. 19, 2016, which claims the benefit of, and priority to, French Patent Application No. 15/02200, filed on Oct. 19, 2015. The entire disclosures of each of the above applications are incorporated herein by reference.

FIELD OF THE INVENTION

The present invention relates to a device for storing and generating energy in an aquatic, in particular subaquatic, environment.

BACKGROUND OF THE INVENTION

Patent specification WO2015114440 describes the prior art and proposes such a system comprising a floating platform on the surface of a body of water (lake or sea), equipped with a lift system which allows weights to be raised and lowered one by one in order to store and generate electricity by means of an electric motor/generator. The weights are stored in the upper position by being attached to one or more floats, at least part of which is located at the surface when said weights are stored in the upper position. In the lower position, the weights are set down on the bottom of the body of water. Before and after having been driven by or having driven the lift system, the weights can be attached to and then detached from the lift system by using underwater robots equipped with an articulated arm.

Since the platform and at least part of the floating component of the weights are positioned at the surface, they are subjected to surface winds and currents which result in very substantial anchoring and stabilisation costs, particularly if the system has to be dimensioned to withstand major storms and a heavy swell.

When the sea is rough, the movements, in particular the vertical oscillation movements, which the platform and to a lesser extent the weights stored in the upper position undergo may have an impact on the lift system, in particular on the cable, and disrupt the operations involved in attaching/detaching the weights to/from the cable of the lift system. The vertical oscillation movements of the weights attached to the lift system may also prevent the weights from being set down gently on the bottom of the body of water and so result in higher costs for said weights or reduce the life thereof.

The present invention proposes inter alia reducing or eliminating the exposure of the platform and the weights stored in the upper position to surface wind and currents and reducing or eliminating platform movements and their impact on the operations involved in attaching/detaching the weights and setting them down on the bottom of the body of water.

According to the invention, the weights in the upper energy storage position and the lift platform are stabilised at a depth such that the effect of the wind and currents are greatly reduced.

SUMMARY OF THE INVENTION

First of all, a first object of the invention consists in providing a system for storing and generating electrical energy which makes it possible to tackle the peaks in electrical energy consumption which alternate with low consumption.

Another object of the invention consists in providing a system for storing and generating electrical energy in large quantities.

Still another object of the invention consists in providing an autonomous system for storing and generating electrical energy which operates on demand as a function of peaks in consumption.

Another object of the invention consists in providing a solution which uses the available space in the most environmentally friendly manner possible and which is sheltered from bad weather.

To achieve this, the invention provides a system for storing and generating electrical energy in an aquatic environment, comprising:

- a plurality of weights, the density of which is greater than that of water.
- a generator lift, arranged to cooperate with the weights and, in generation mode, to allow said weights to descend to the bottom zone and, in drive mode, to raise them back up towards the surface;
- a platform capable of supporting the upper portion of the generator lift when the latter is loaded or unloaded with weights (135). This platform, the generator lift platform, will be designated PAG in the remainder of the present description.
- anchoring cables connecting the PAG platform to the bottom of the body of water and exerting a downwards force on the platform and making it possible to maintain the platform at a sufficient depth below the surface and prevent it from rising up to surface level.
- floats fixed to the PAG platform exerting an upwards force, opposed to that of the anchoring cables, and making it possible to maintain the platform at the desired depth and preventing it from sinking, in particular when the lift is loaded with weight.
- a second platform making it possible to store the weights when they have to stored in the upper position. This platform, the weight attachment platform, will be designated PAP in the remainder of the present description. This PAP platform is located below the surface and maintained at a given depth close to the PAG lift platform.
- anchoring cables connecting the PAP platform to the bottom of the body of water making it possible to maintain it at a sufficient depth below the surface of the body of water.
- floats fixed to the PAP platform or included in said platform, making it possible to stop the latter from sinking, in particular when it is loaded with weights which are attached thereto. These floats can consist of a flexible gas reservoir or a rigid reservoir filled with water or gas. These floats are provided with orifices which make it possible to inject or remove gas or water by a means such as a compressor, such that the volume of gas they contain and therefore their buoyancy can be modified. This feature allows continuous adjustment of the buoyancy of the PAP platform as a function of the number of weights which are attached thereto and so reduce the thickness and cost of the anchoring cables connecting the PAP platform to the sea bottom.
- a reversible motor or an electric motor and generator cooperating with the generator lift and allowing, in generation mode, the production of electrical energy due to the action of the weights as they descend, and, in drive mode, actuation of the lift to raise the weights back up.

Using such an architecture, the invention proposes an on-demand solution which makes it possible to manage not only peaks in electricity consumption but also more off-peak periods.

According to one advantageous embodiment, the system has a reversible motor or a motor and a generator, borne by the lift platform (PAG) which cooperates with the upper portion of the generator lift.

According to another advantageous embodiment, the generator lift consists of a pulley assembly actuating a belt between the PAG platform and the bottom of the body of water.

According to another advantageous embodiment, the pulley assembly comprises one or more pulleys close to the surface (203) borne by the PAG platform and one or more bottom pulleys.

According to another advantageous embodiment, the pulleys borne by the PAG platform, in particular the surface pulley (103), cooperate mechanically with the reversible motor via a transmission.

According to another advantageous embodiment, the generator lift consists of a winch borne by the PAG platform, a winch cable and at least one hook.

Advantageously, the winch cooperates mechanically with the reversible motor via a transmission.

Likewise advantageously, the weights are substantially elongate in shape.

Likewise advantageously, each of the floats of the PAP platform comprises a control system for managing the fluid flow rates of air and water in fluidic cooperation with the interior of the reservoir and the exterior of the platform.

The invention also provides a method for storing and generating electrical energy in an aquatic environment, comprising the steps consisting of:
in generation mode, effecting descent of a plurality of weights to the bottom zone using a generator lift connecting a PAG platform positioned substantially below the surface to a bottom zone, such that the force exerted by the weights allows the generator lift to actuate a generator in electrical energy production mode; and
in drive mode, raising said weights back up towards the surface, using the generator lift, the reversible motor then being in drive mode and ensuring drive of the generator lift.

According to one embodiment, the barge (floating platform) comprising the compressor may also be positioned some tens of metres below the surface of the water and be connected to the atmosphere by a duct, one end of which floats on the surface; or connected to an air reservoir which may be located at or below the surface.

DESCRIPTION OF THE FIGURES

All the details of embodiment are given in the following description, supplemented by FIGS. 1 to 19, which are provided solely by way of non-limiting example and in which:

FIG. 1 also shows a barge at the surface in particular comprising a compressor.

The depth of several tens of metres of the PAP and PAG platforms is stated indicatively, it being possible for the depth to be greater than or equal to zero.

Figure 1:
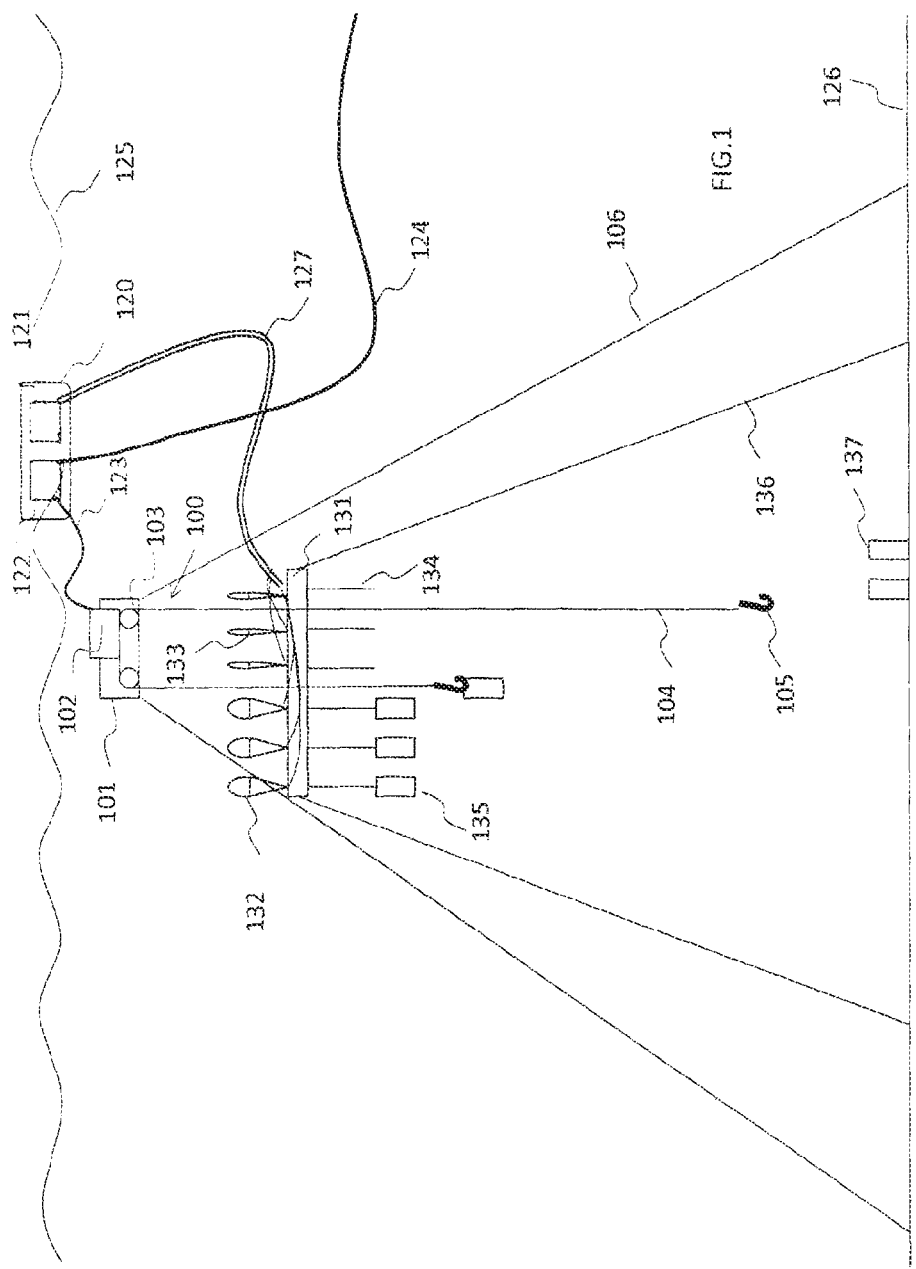
FIG. 1 is a schematic representation of a first exemplary embodiment of a system for storing and generating energy in an aquatic environment according to the invention implemented by a system comprising a lift platform (PAG) positioned some tens of metres below the surface and provided with a cable comprising a hook at each of the ends thereof and a weight attachment platform (PAP) separate from the PAG platform and suspended from a plurality of flexible floats, said PAP platform also being positioned some tens of metres below the surface.
Figure 2:
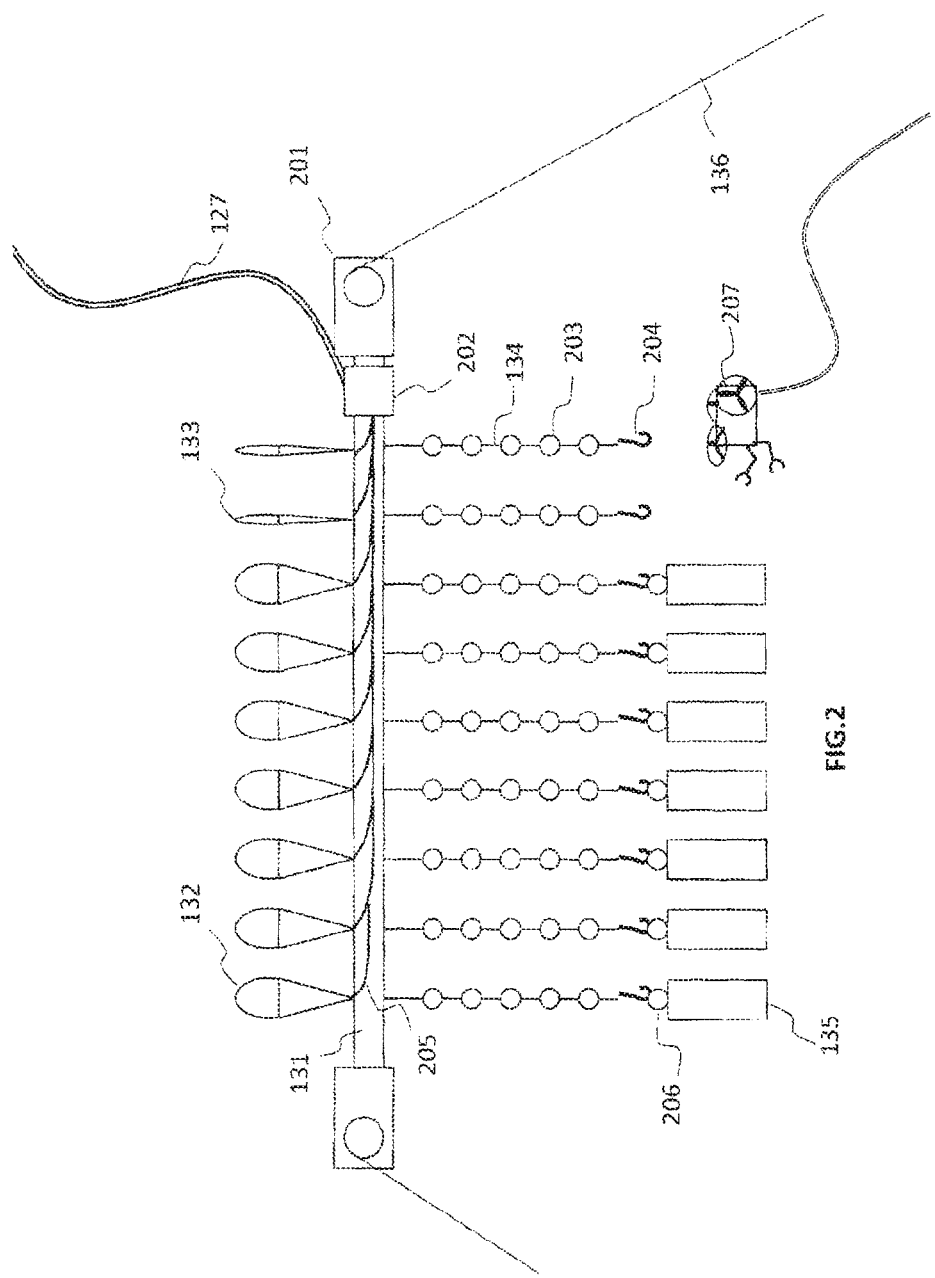

FIG. 2 is a detailed schematic representation of the PAP weight attachment platform shown in FIG. 1; in particular, it includes winches fixed to the anchoring cables and shows the compressed gas ducts which allow gas to be injected into or removed from the flexible floats.

Figure 3:
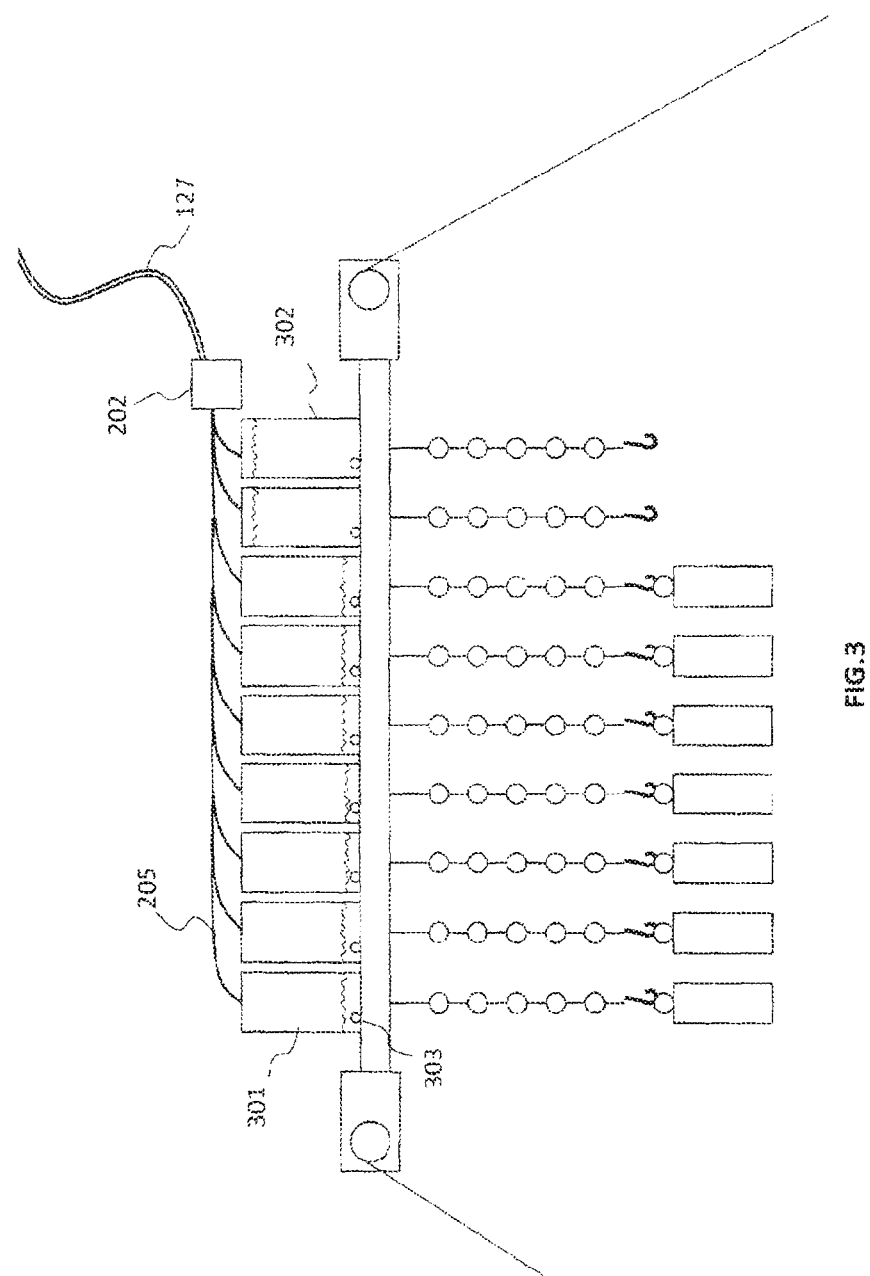

FIG. 3 is a schematic representation of an exemplary embodiment of a PAP platform comprising floats in the form of ballast tanks which can be filled with water or air.

Figure 4:
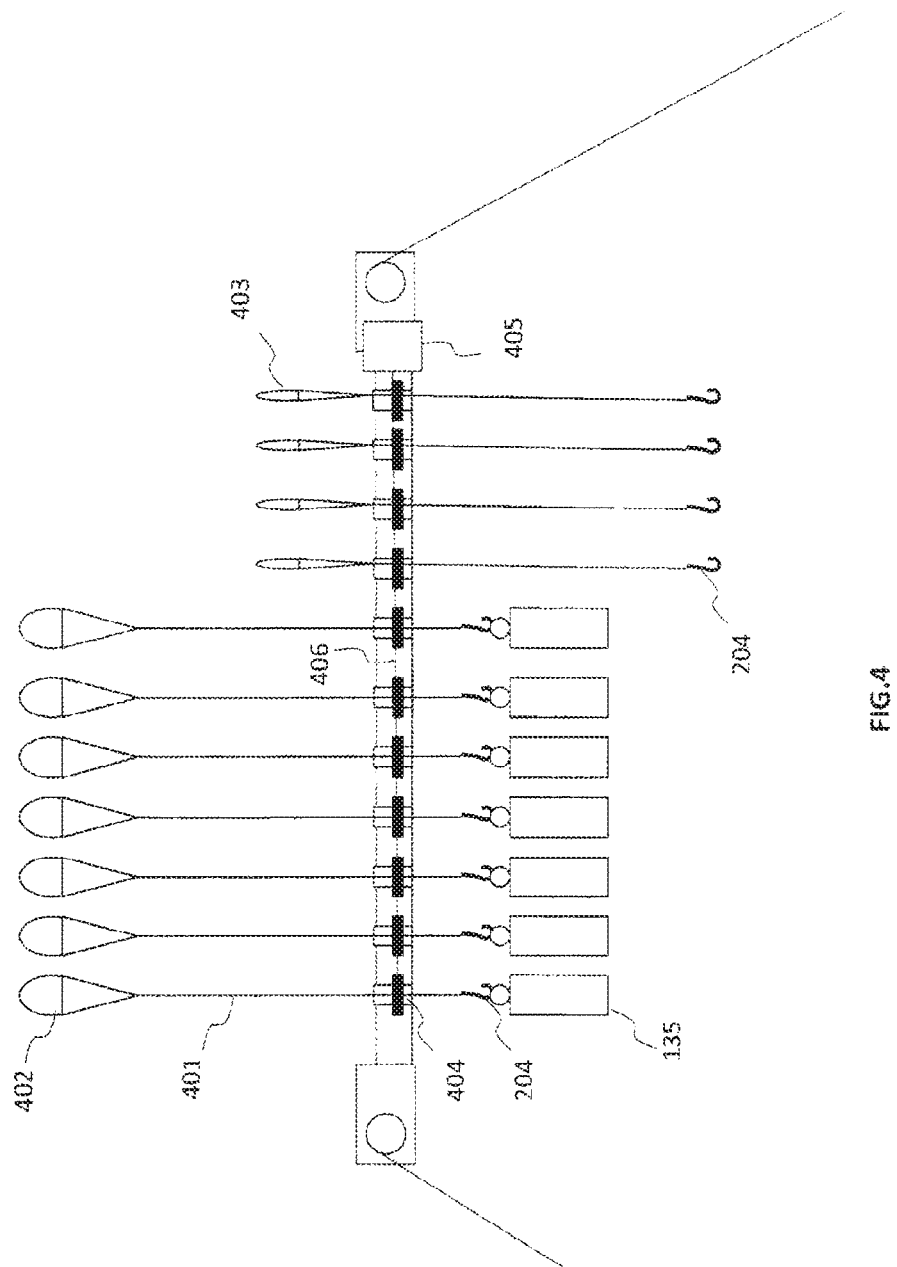

FIG. 4 is a schematic representation of an exemplary embodiment of a PAP platform comprising flexible floats fixed to the platform by cables of variable length so making it possible to vary the depth and therefore the volume of said floats as required.

Figure 5:
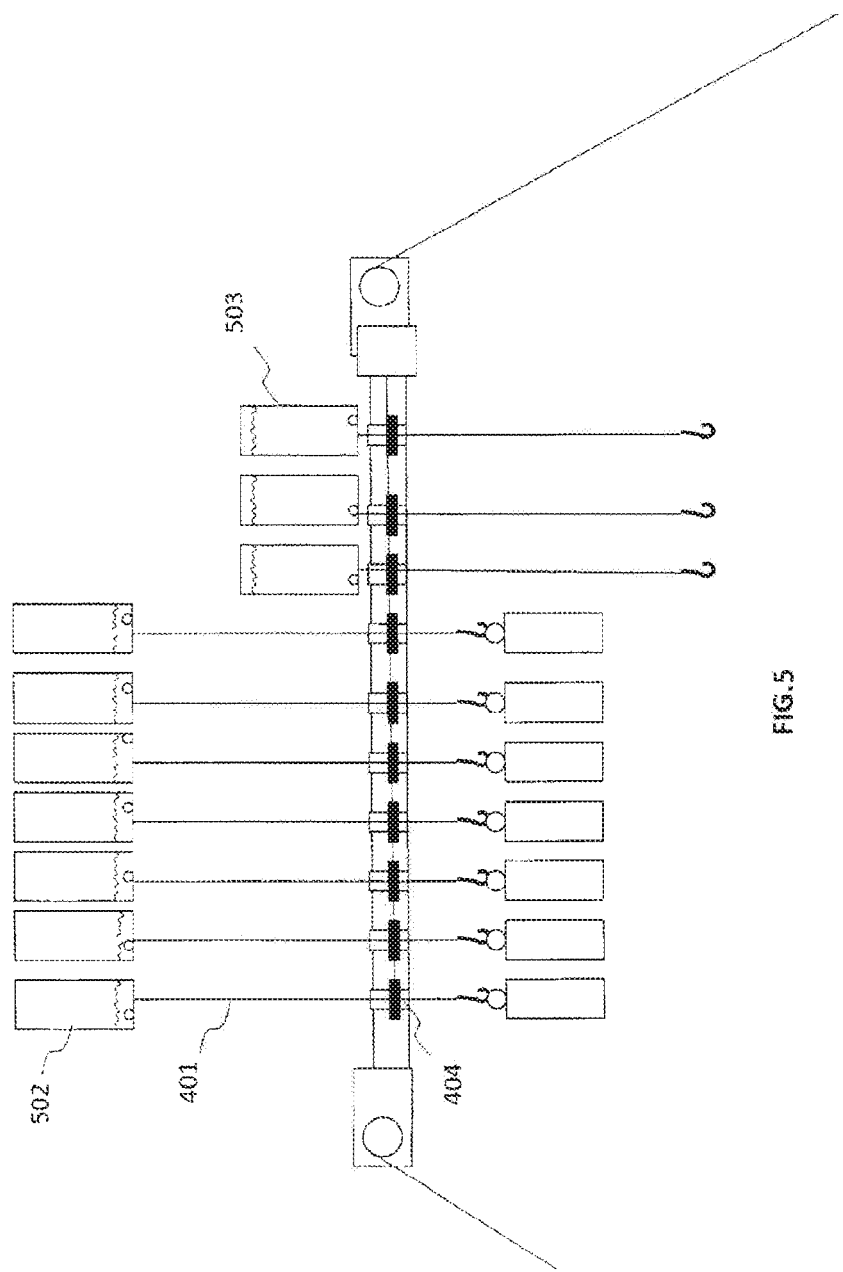

FIG. 5 is a schematic representation of an exemplary embodiment of a PAP platform comprising floats in the form of ballast tanks fixed to said platform by cables of variable length so making it possible to vary the depth and therefore the volume of said floats as required.

Figure 6:
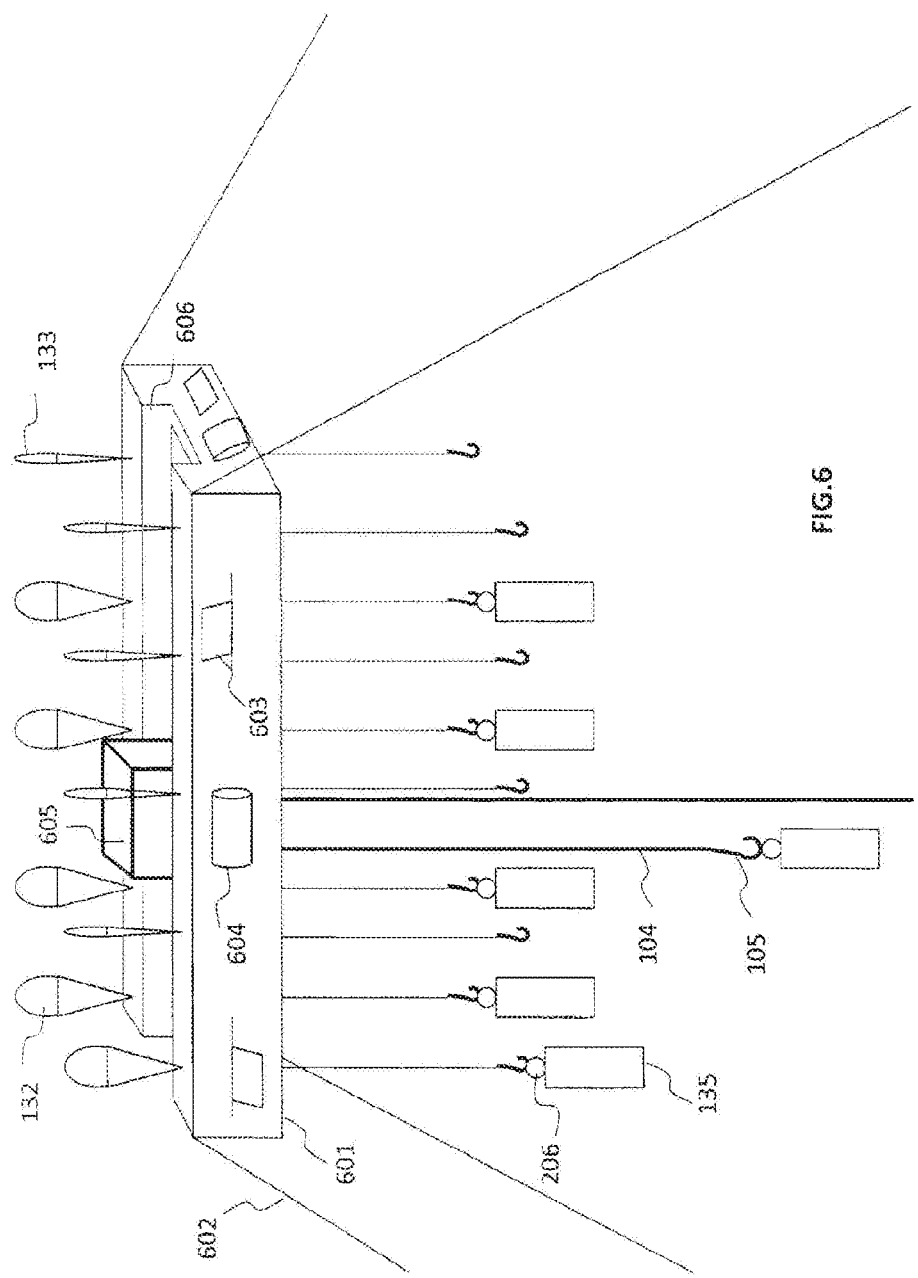

FIG. 6 illustrates another embodiment in which the PAG platform is integrated in the PAP platform. The PAG platform is shown therein as being capable of moving along an axis on a rail integrated in the PAP platform.

Figure 7:
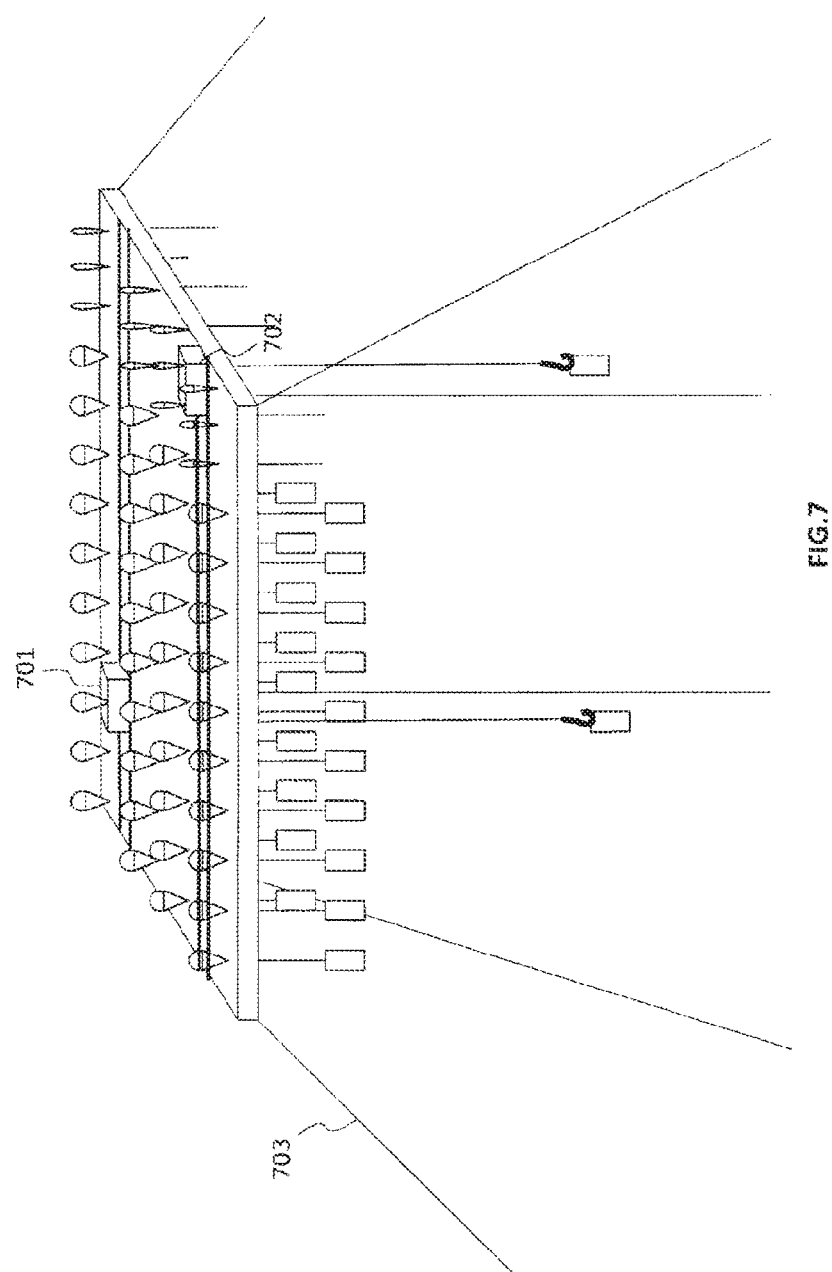

FIG. 7 illustrates another embodiment in which two PAG platforms are integrated in a PAP platform.

Figure 8:
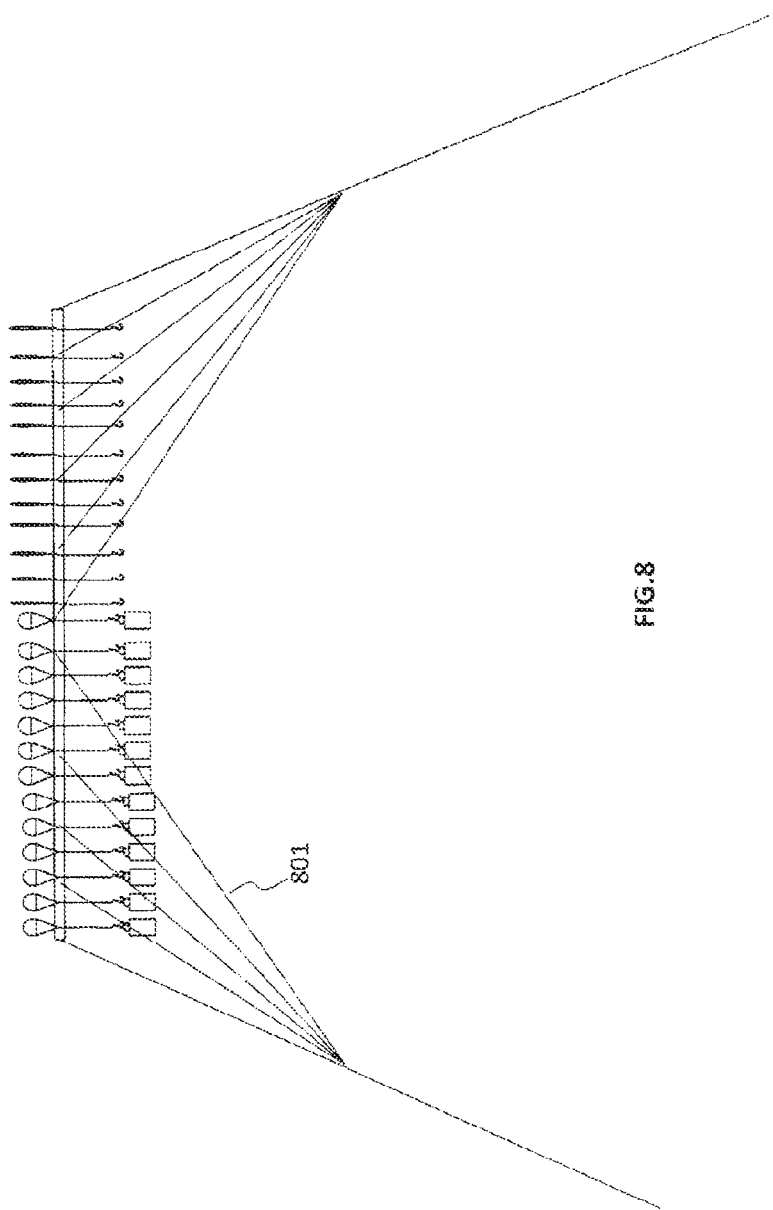

FIG. 8 shows an anchoring cable assembly in the form of stays fixed to the platform at different points along said platform.

Figure 9:
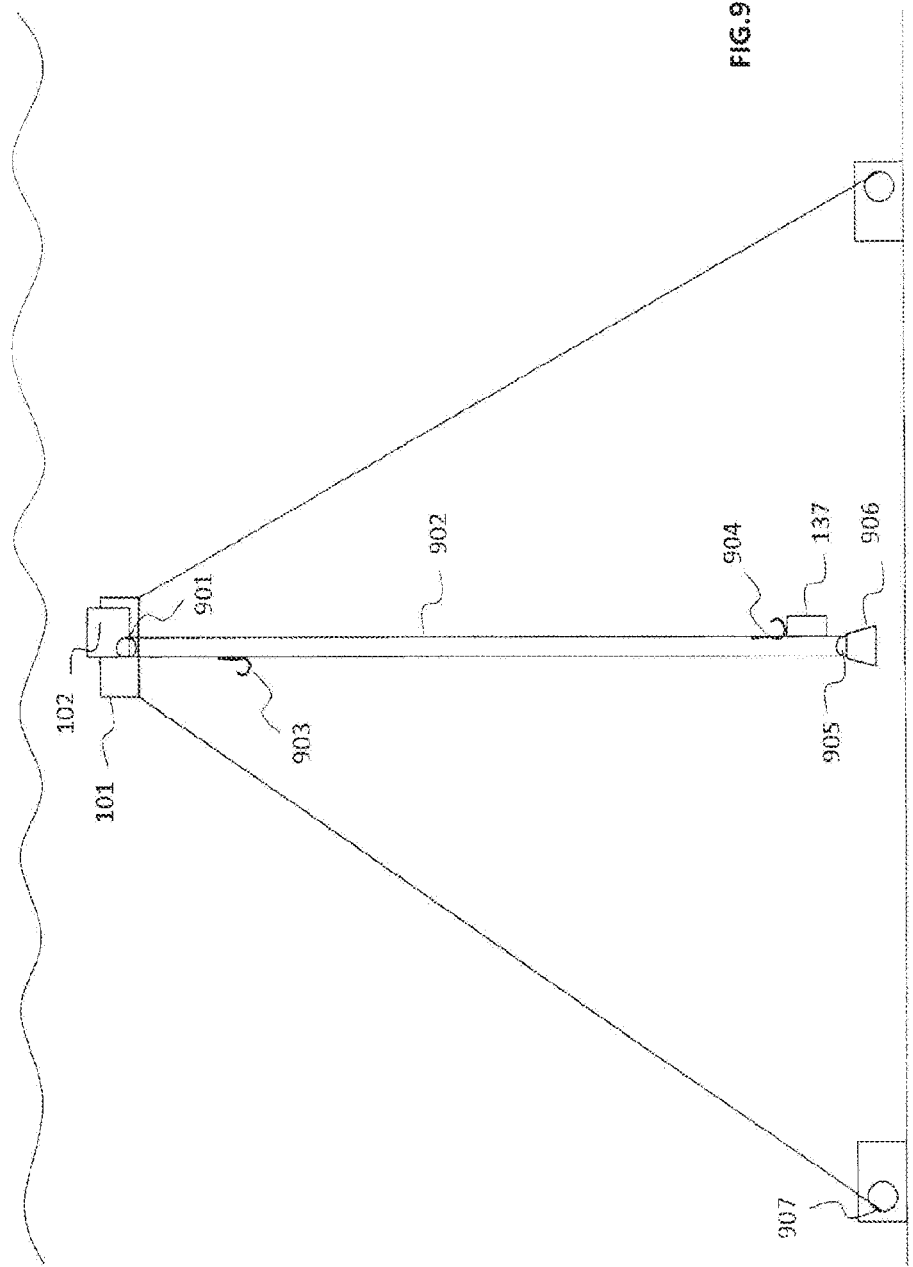

FIG. 9 illustrates another embodiment of the PAG lift platform in which the main cable is connected to a pulley positioned close to the bottom of the body of water.

Figure 10:
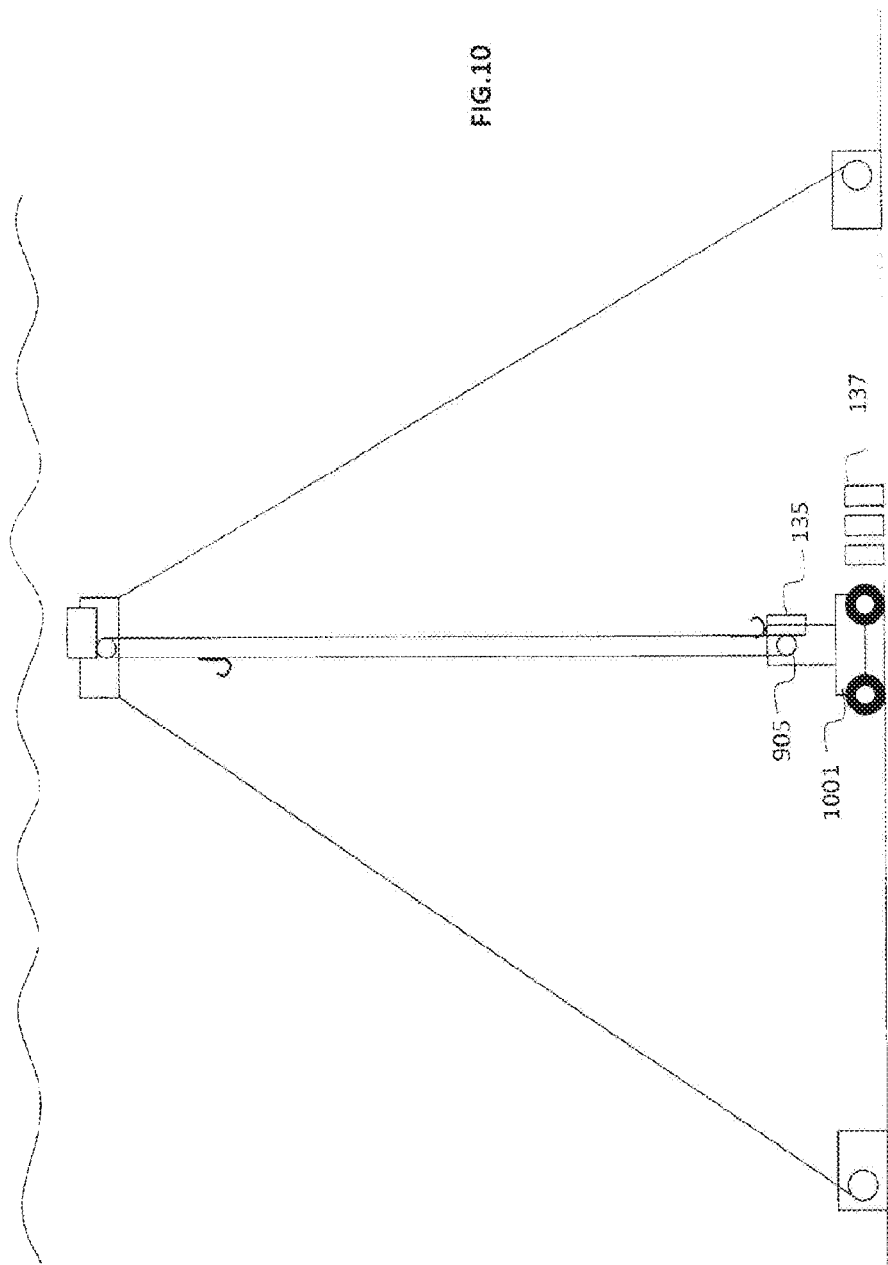

FIG. 10 illustrates another embodiment of the PAG lift platform in which the main cable is connected to a pulley fixed to a trolley set down on the bottom of the body of water.

Figure 11:
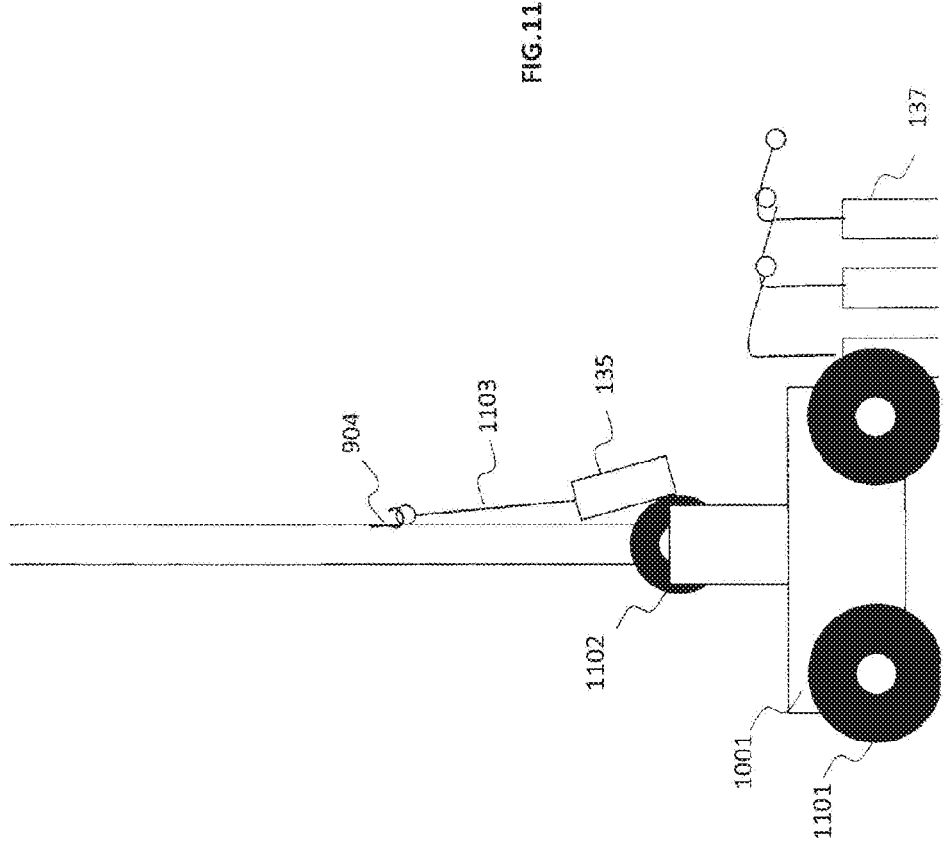

FIG. 11 is a detailed schematic representation of the trolley in profile view.

Figure 12:
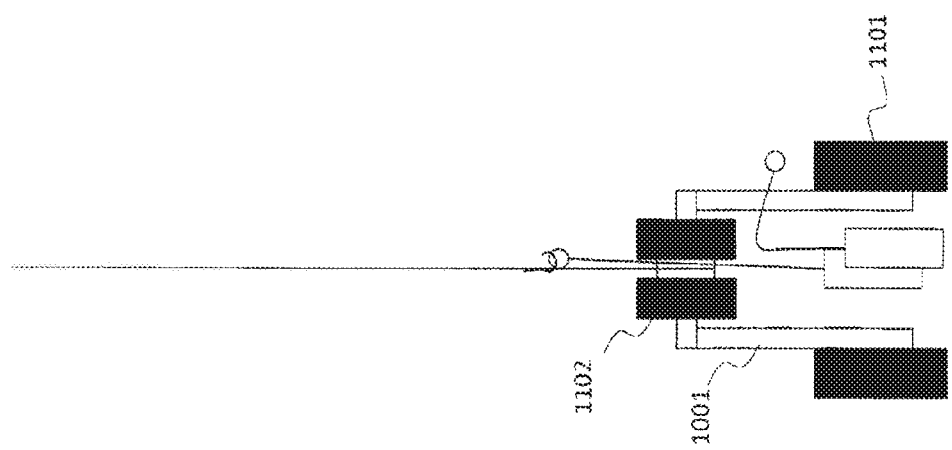

FIG. 12 is a detailed schematic representation of the trolley in end view.

Figure 13:
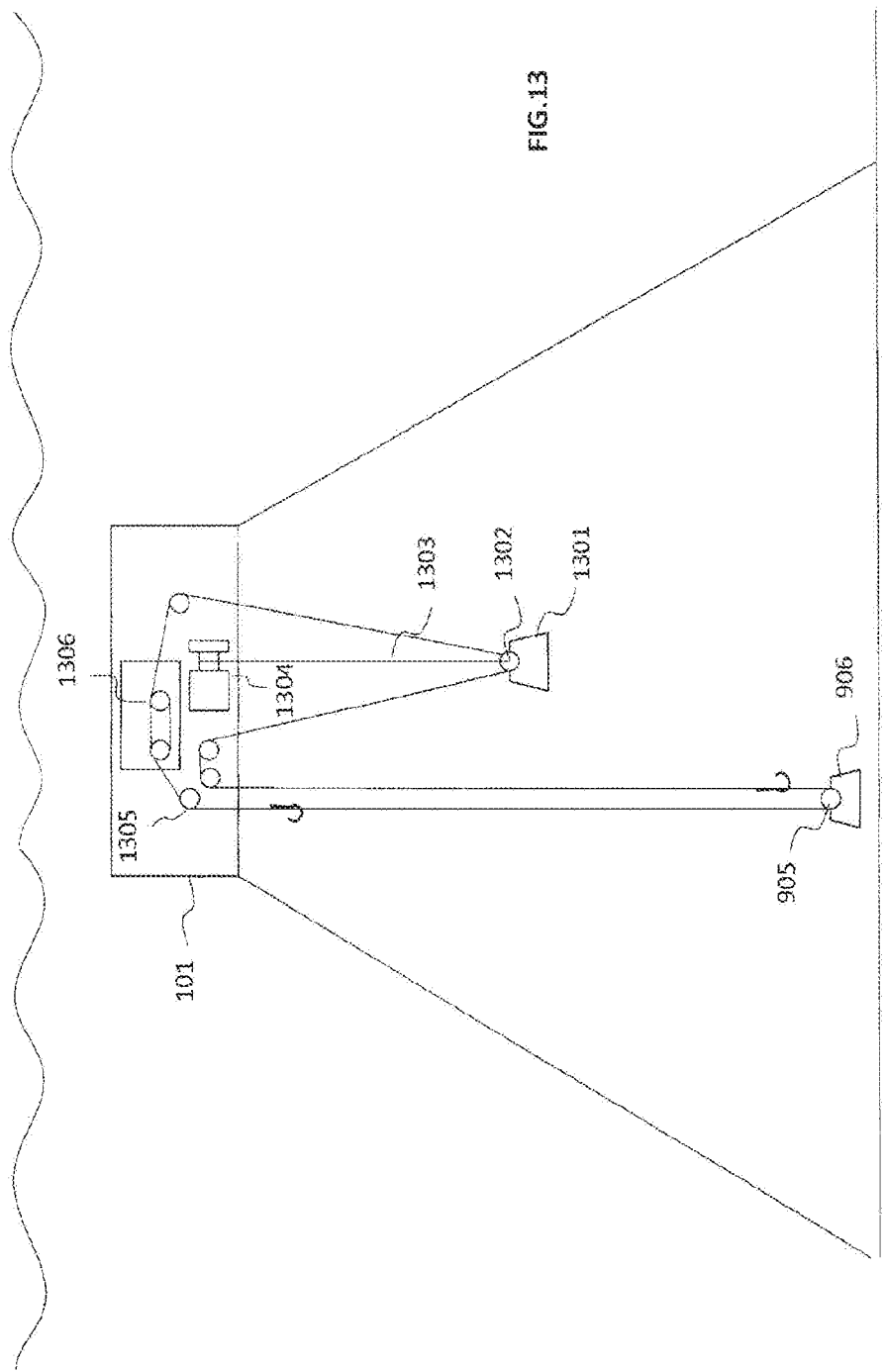

FIG. 13 is a detailed schematic representation of the PAG lift platform provided with a pulley positioned close to the sea bottom and of its cable length compensation system in particular comprising drive pulleys, return pulleys and a winch.

Figure 14:
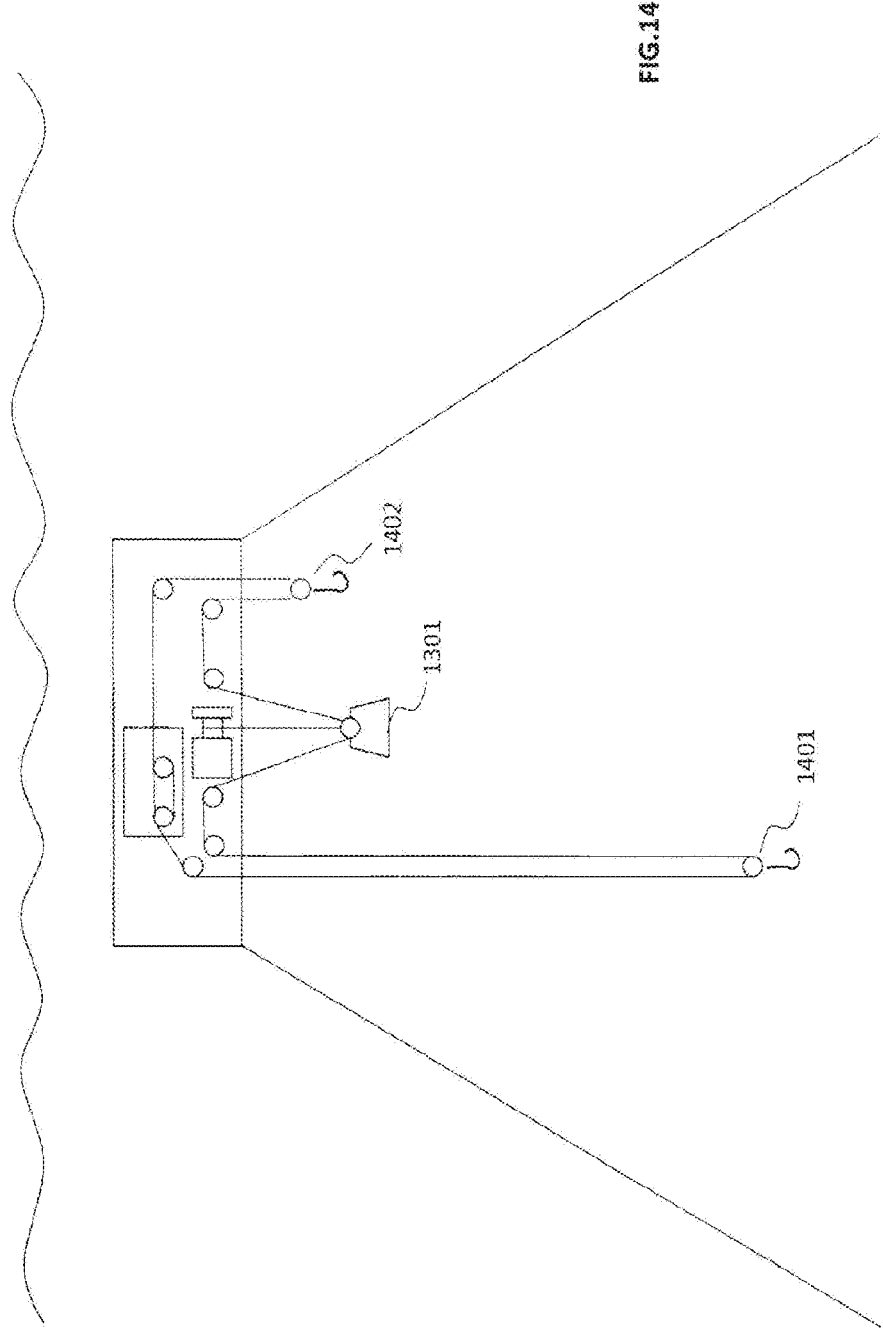

FIG. 14 is a detailed schematic representation of the PAG lift platform provided with a cable with a hook at each of the ends thereof and of its cable length compensation system in particular comprising drive pulleys, return pulleys and a winch.

Figure 15:
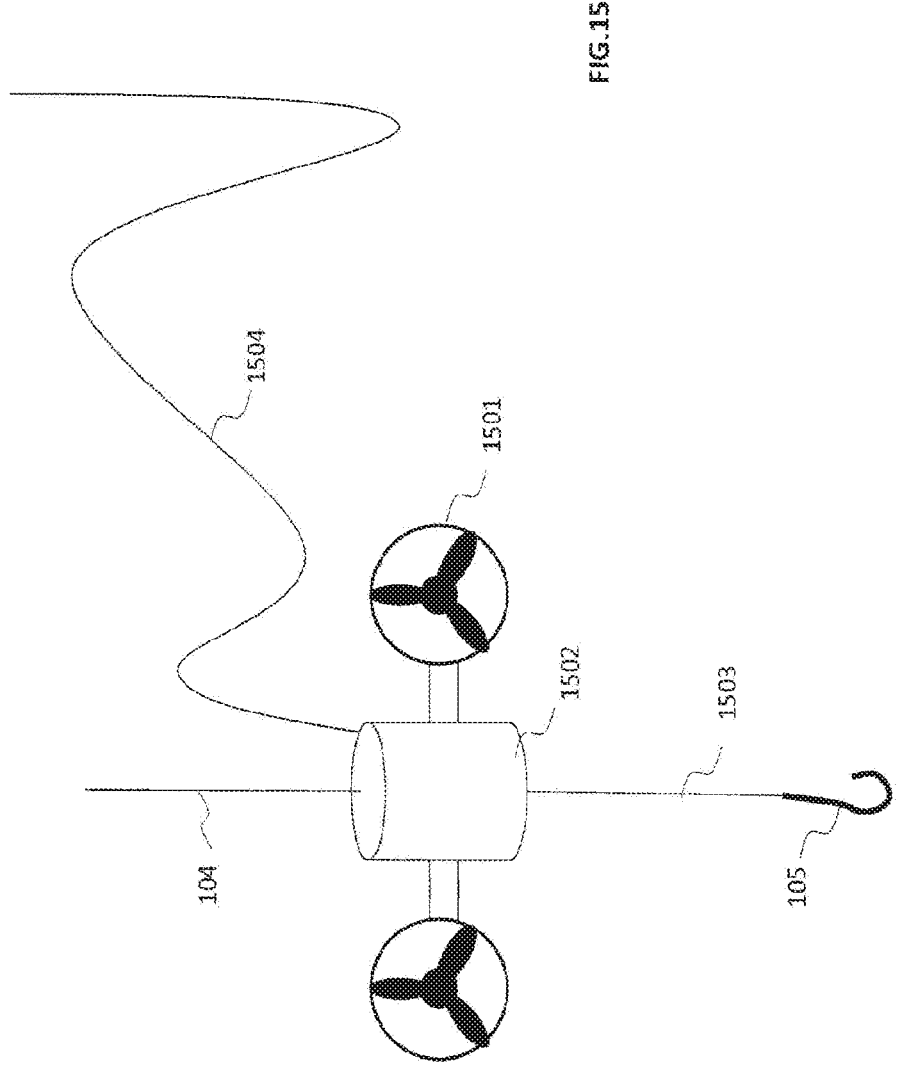

FIG. 15 illustrates an embodiment of the hooks which allows the rotary and transverse movements of said hook to be controlled by means of a thruster assembly.

Figure 16:
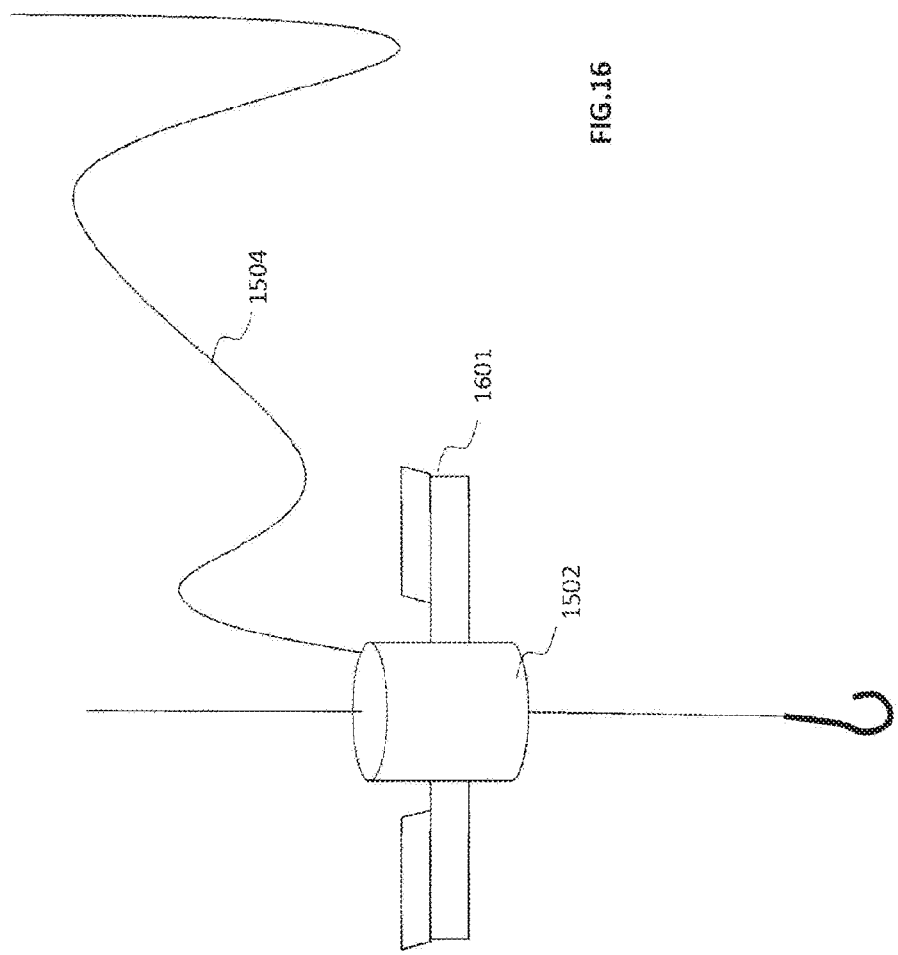

FIG. 16 illustrates an embodiment of the hooks which allows the rotary movements of said hook to be controlled by means of a fin assembly.

Figure 17:
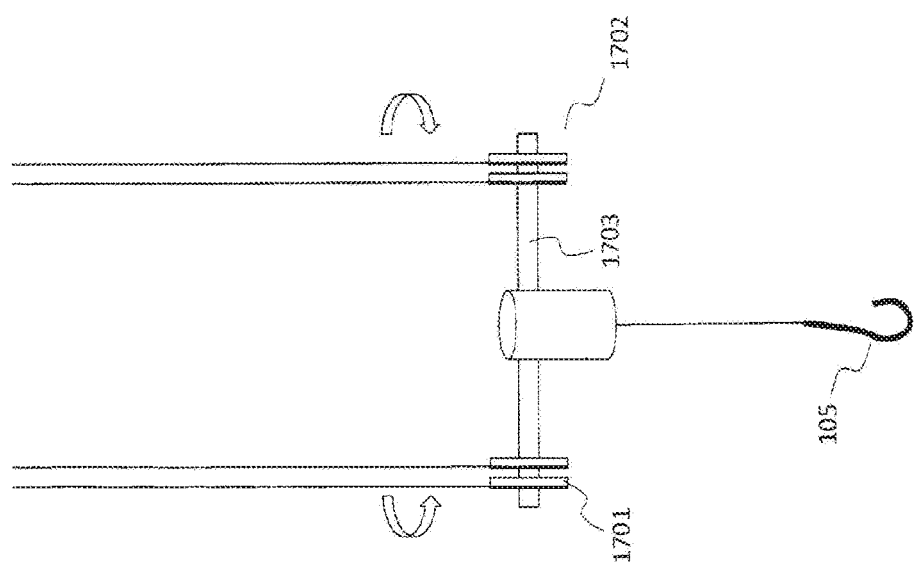

FIG. 17 illustrates an embodiment of the hooks comprising at least two pulley blocks on either side of the hook which in particular make it possible to use at least two cables having opposing winding directions of the strands.

Figure 18:
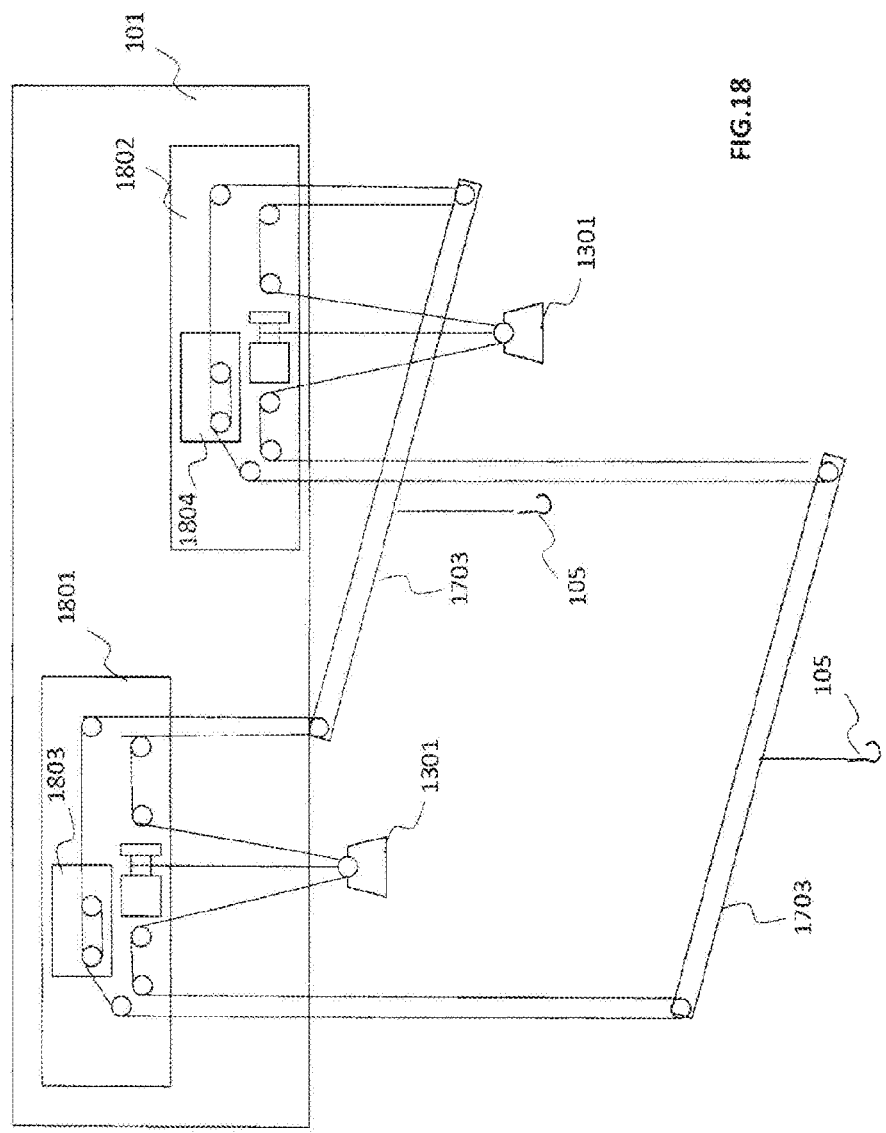

FIG. 18 illustrates an advantageous way of connecting the two cables shown in FIG. 17, such that they pass into separate pulley assemblies at the level of the PAG platform. Said pulleys are drive pulleys and return pulleys. FIG. 18 does not snow any couplings which may be implemented between the drive pulleys.

Figure 19:
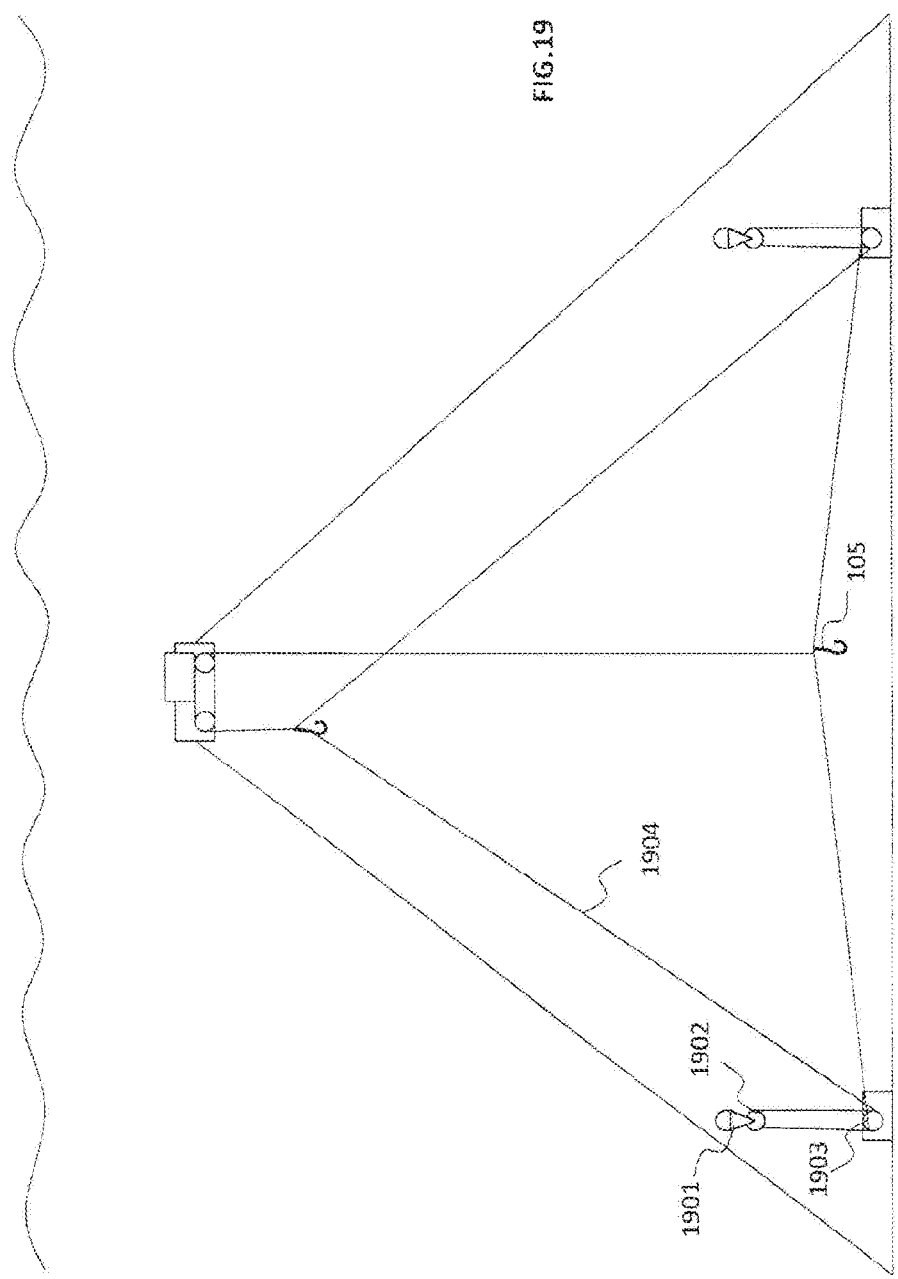

FIG. 19 is a schematic representation of secondary cables, each end of which is fixed to each of the two hooks, and which pass via the return pulleys fixed to the sea bottom and to floats.

Figure 20:
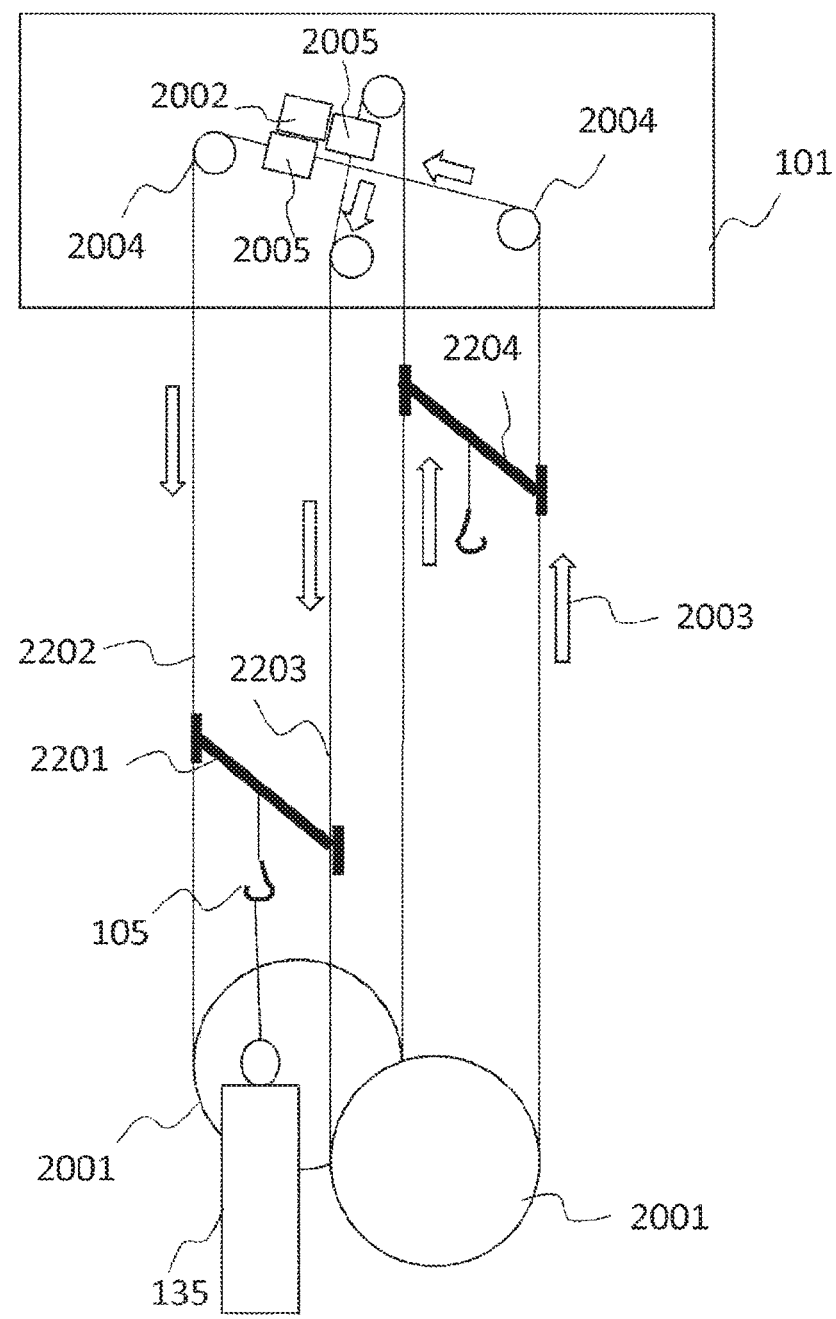
Figure 21:
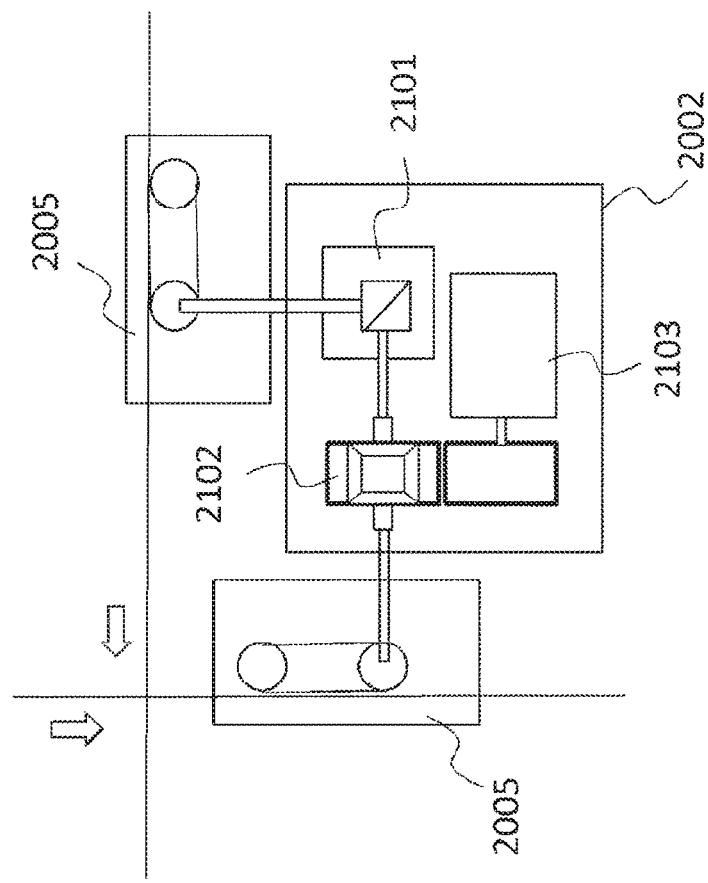

FIG. 20-22 illustrate a variant of the generator lift system.

DETAILED DESCRIPTION OF THE INVENTION

FIG. 1 illustrates a first embodiment of a system for storing electrical energy in a marine and underwater environment according to the invention, in which potential energy is stored by means of a plurality of immersed weights (135) which, as they descend towards the bottom (126) of the body of water, actuate a generator in order to produce the electrical energy. This energy is advantageously produced during periods of peak consumption of a mains grid connected to the system of the invention, in order to assist the main energy production grid. Conversely, when excess electricity is available on the grid, the system operates in drive mode by lifting the weights (137) back up one by one from the bottom of the body of water up to a height located below the surface. The system advantageously comprises a large number of weights, thereby making it possible to generate energy repeatedly (or continuously), over the long term.

The system illustrated comprises a main PAG platform (101) comprising floats which are not shown on the drawing. This PAG platform is stabilised below the surface (125) by anchoring cables (106). The PAG platform is located at a depth of some tens of metres in order to minimise its exposure to surface currents. This platform comprises a generator lift system consisting of a cable (104) which is provided with at least one hook (105) at each end and passes via return pulleys (103) and drive pulleys. The drive pulleys are coupled to an electric motor and generator via a torque reducer, a clutch system and a gearbox. The assembly (102) shown in FIG. 1 comprises the motor, the generator, the reducer, the clutch, the gearbox and the drive pulleys.

The motor may be reversible and operate in generation mode, in which case a generator is not necessary. The motor and generator are connected by electrical cables (123) to a floating platform (120) located at the surface (125). The electric current may then be transformed to a different voltage level by a transformer or be converted from direct current to alternating current or vice versa by a converter. The transformer and converter are denoted (122) on the figure. An electrical cable connects the platform (120) to the electricity grid via an underwater electrical cable (124).

The system also comprises a PAP attachment platform (131) which allows the weights to be attached thereto when they are stored in the upper position. This platform is located close to the generator lift platform, in particular in order to allow weights to be attached to the generator lift before said weights are detached from the PAP platform during the electricity production phase, and vice versa during the storage phase. These operations which permit attachment or detachment of the weights to/from the PAP platform or to/from the lift cable may advantageously be carried out by means of slings or a plurality of slings available for each weight.

The PAP attachment platform comprises a plurality of floats (132), the variable volume of which allows continuous adjustment of the buoyancy of said PAP platform to the number of weights which are attached thereto. The floats may be filled with (132) or emptied of (133) a gas via a compressed gas duct assembly connected to a compressor (121) located on the floating platform (120). The weights in the upper position (135) are attached to the PAP platform by means of an attachment cable (134).

The PAP attachment platform is stabilised and connected to the bottom of the body of water by means of anchoring cables (136).

FIG. 2 provides a more detailed illustration of the PAP weight attachment platform. It shows winches (201) connected to the anchoring cables (136). These winches have the function of adjusting the horizontal position of the PAP platform as required, in particular for positioning it precisely above the pick-up point on the PAP attachment platform and the site for setting down the weights.

These winches also allow the depth of the PAP platform to be adjusted.

At least one duct (205) per float (132, 133) joins each float and a device (202) which allows said duct to be selectively connected to the main duct (127).

FIG. 2 also shows a detailed view of the weight attachment device. The latter comprises the attachment cable (134) on which are positioned floats (203) in order to reduce the relative weight of said cables and to facilitate handling thereof and of the hooks (204) by underwater robots (207) of the "Remotely Operated Vehicle" (ROV) type. An attachment device (206) which can assume the form of a ring allows the weight (135) to be attached to the hook (204). In a variant, slings, which are not shown in FIG. 2, can join the weight (135) to the attachment device (206). A plurality of slings and attachment devices (206) can be fixed to each weight (135). All the slings can be provided with floats in order to reduce the relative mass of said slings and to facilitate the handling thereof by the ROV (207). A plurality of slings can also be fixed between the hooks (105) and the lift cable (104).

FIG. 3 illustrates a variant of the attachment platform (PAP) shown in FIGS. 1 and 2. The floats shown therein consist of ballast tanks which can be filled with (302) or emptied of (301) a volume of water by an orifice located in the lower part thereof and connecting the interior of said ballast tanks to the exterior of the system. Said ballast tanks can advantageously be filled and emptied by injecting compressed gas through an orifice and a valve located in the upper part and connected via one or more ducts (205) to a compressor located at the surface in a similar manner to that shown in FIGS. 1 and 2.

FIG. 4 illustrates a variant of the attachment platform (PAP) shown in FIGS. 1, 2 and 3. Each float is attached directly to a weight by means of cables (401) which pass into an orifice (404) extending through the platform from top to bottom. This orifice is equipped with a cable locking mechanism which can be controlled remotely, in such a manner that when a weight is being detached from the PAP platform, the cable (401) can be locked and fastened to the platform at a point closer to the float. By being positioned at a greater depth and as a result of the higher pressure, the volume of the flexible float will be reduced (403) and it will exert a weaker upwards force in order to compensate for the absence of the weight. The cable locking mechanism can advantageously be similar to the brakes conventionally used on lifts, freight lifts, cranes or cable cars. According to one non-exclusive embodiment, each of these mechanisms can be actuated selectively and with a variable amplitude and set in motion by an electric, electromagnetic, hydraulic or pneumatic force conveyed by a circuit (406) connected to a distribution, monitoring and control device (405).

FIG. 5 shows a variant of the system shown in FIG. 4. The floats consist of ballast tanks which contain a volume of water which varies with depth and therefore external pressure. As the weights are attached to or detached from the PAP platform, the volume of air present in these ballast tanks will be respectively greater (502) or lesser (503). Consequently, their buoyancy will reduce when they are fastened to the PAP platform at a greater depth.

FIGS. 4 and 5 show variants in which injection of a compressed gas by means of a compressor is not necessary. The invention includes other variants which can simultaneously combine the variants shown in FIGS. 2, 3, 4 and 5.

FIG. 6 illustrates a variant of the invention according to which the PAG generator lift platform (605) is fastened to the PAP weight attachment platform (601) by means of a rail system (606) or any other means enabling the PAG lift platform to move in one or two axes on the PAP attachment platform. Such means may, non-limitingly, include systems similar to those used on the hoists mounted on bridge cranes, a trolley moved along a rack, or by winches.

Mobile fins (603) and propeller thrusters (604) can be positioned around the PAP platform in order to facilitate the stabilisation thereof when said platform is located in a zone affected by underwater currents.

FIG. 7 illustrates a variant of the system shown in FIG. 6. Two PAG lift platforms (701 and 702) are associated with a single PAP attachment platform.

The invention also provides variants according to which one attachment platform (PAP) may comprise more than two PAG lift platforms, or according to which a plurality of PAP attachment platforms can be used for a single PAG lift platform.

The invention also provides variants according to which the PAP attachment platform is located at the surface with a PAG lift platform located below the surface or, conversely, a PAG lift platform located at the surface and a PAP attachment platform located below the surface. In the case that the PAP attachment platform is located at the surface, at least part of the floating components of which said assembly consists are located at the surface, as described in patent specification WO2015114440.

FIG. 8 shows an anchoring cable device with stays (801) which makes it possible to transfer the downward tensile forces at various points of the PAP platform and so reduce bending loads in said platform and ensure greater equilibrium of the forces of the anchoring cables with the forces exerted by the floats.

FIG. 9 illustrates a variant of the generator lift system. In this system, the lift cable (902) is continuous and passes via a return pulley (905) located close to the bottom of the body of water. The cable is tensioned thanks to a weight (906) fixed to the pulley. Two hooks (903, 904) fixed to the cable permit attachment of the weights (137) which will be lowered one by one and then raised back up from the bottom of the body of water.

Winches (907) are located on the sea bottom in order to adjust the length of the anchoring cables and facilitate the movements of the PAG lift platform. Propeller thrusters, not shown in the figure, can be fixed to the PAG lift platform or at the level of the weight (906) in order to increase the precision of positioning.

FIG. 10 illustrates a variant of the system shown in FIG. 9. The return pulley (905) is fixed to a mobile chassis (1001) which is mounted on driving wheels or caterpillar tracks and makes it possible to improve the precision with which the weights are set down on (during the electricity production phase) or picked up from (during the energy storage phase) the sea bottom.

FIG. 11 provides a more detailed profile view of the trolley and shows wheels (1102) which allow the weight to be guided around the return pulley without coming into contact with said pulley. The surface of the wheels 1102 is advantageously covered with materials which are flexible and robust. The figure shows a trolley mounted on wheels (1101). The invention also provides variants according to which the trolley is mounted on caterpillar tracks or wheels set down on rails. The figure also shows fixed slings (1103) connecting the weight (135) to the hook (904). Such slings, which are not shown on the other figures, can be permanently fixed to each of the weights included in the system.

FIG. 12 shows an end view of the trolley illustrated in profile in FIG. 11.

FIG. 13 shows a mechanism which makes it possible to vary the length of the lift cable between the PAG platform (101) and the return pulley (905). This system in particular makes it possible to adjust the length of cable required when the PAG platform is not positioned vertically above the point on the sea bottom where the weights are set down and picked up, for example when underwater currents cause an oblique drift or curvature on the lift cable or in order to compensate the elongation or shortening undergone by the cable when a weight is respectively loaded or unloaded. This system in particular comprises a winch (1304) connected to a return pulley (1302) tensioned by a weight (1301) arranged such that the lift cable passes through the drive pulley assembly (1306), by return pulleys located on the PAG platform (1305) and by a return pulley (1302) located on the weight (1301).

FIG. 14 shows a mechanism which makes it possible to vary the length of a lift cable according to one variant comprising one cable and two hoists (1401, 1402).

FIG. 15 illustrates a variant according to which the hooks (105) are fastened to the lift cable (104) by means of a positioning unit (1502) and thrusters (1501) which make it possible to orient the position of the hook in order to control the rotary movements and the horizontal translation movements thereof. The positioning unit may comprise position control systems such as gyroscopes, compasses, cameras, depth gauges and sonar, and power supply systems such as batteries or electrical power supply cables (1504) connected to an electrical distribution station which is not shown in the figure and may be located at the surface, below the surface or on the bottom of the body of water.

FIG. 16 shows a variant of the system shown in FIG. 15, according to which the mechanism for controlling rotary movement is provided by ailerons (1601) during the raising or lowering phases.

The invention may comprise a combination of the systems shown in FIGS. 15 and 16.

FIG. 17 shows a variant according to which the hook (105) is borne by two hoists (1701, 1702) positioned at each end of a beam (1703) around the axis of the hook.

The hoists can have cables running therethrough which have reversed strand winding directions, so reducing the overall rotary effect on the hook including at very great depths such as oceanic depths (4000 metres).

FIG. 18 shows two separate pulley assemblies (1801, 1802) for each of the two hoists shown in FIG. 17. The drive pulley assemblies (1803 and 1804) can be coupled to the same reducer, the same motor and the same electric generator.

FIG. 19 shows a mechanism composed of return pulleys (1902, 1903) and floats (1902) which makes it possible to orient the movement of the lift hooks transversely by tensioning the cables (1904) on each side of each hook.

These cables make it possible to limit the rotary movements of the hooks and partially compensate the variation in weight of the portion of lift cable on a hoist for the duration of a raising or lowering cycle and consequently limit any variations in the torque/power ratio exerted at the level of the electric motor and generator.

FIG. 20 illustrates a variant of the generator lift system. In this system, each hook (105) is suspended from a beam (2201) fixed to two cable elements (2202 and 2203). The lower part of each cable element passes via a lower return pulley (2001) while the upper part passes via an upper return pulley (2004) positioned on the platform (101). Between the upper return pulleys, the cable elements pass via drive pulley assemblies (2002) connected to a gearbox (2006) shown in FIG. 21. Such a system ensures that the weights (135) do not come into contact with the lower pulleys as they approach the sea bottom. It also makes it possible to dispense with the wheel system (1102) as shown in FIG. 11. The cable elements 2202 and 2203 are part of a single cable from which the second hook is suspended via a second beam (2204).

FIG. 21 illustrates an advantageous way of solving the problem of imbalance of the beam (2201) when the cables (2202 and 2203) are offset. Such an offset, illustrated in FIG. 22, may occur due to accidental slippage of the cable in the drive pulley assemblies (2005). Its effect is potentially major given the overall height of the generator lift which is provided to operate over height differences of several thousand metres. When this phenomenon occurs, the cable having the highest joining point to the beam (2201) exerts a greater force on its drive pulley assembly (2005). The two drive pulley assemblies are therefore subjected to different torque. According to this variant, the two pulley assemblies are connected to a generator motor (2103) by means of a spiral bevel gearbox (2101) and a differential gear (2102) which makes it possible to correct the offset.

REFERENCE SIGNS USED IN THE FIGURES

101 Platform (PAG) supporting the generator lift
102 Motor-generator-reducer-clutch assembly
103 Return pulley
104 Generator lift cable
106 Anchoring cable (of the PAG platform)
120 Floating platform
122 Electrical transformer/converter
123 Electrical cable between PAG (106) and floating platform
124 Electrical cable between floating platform (120) and electric grid
125 Surface of body of water
126 Bottom of body of water
127 Main duct
131 Weight attachment platform (PAP)
132 Flexible float, full
133 Flexible float, empty
134 Attachment cable for weights (135)
135 Weight (in upper position)
136 Anchoring cable of PAP platform
137 Weight (in lower position)
201 Winches connecting PAP and anchoring cables
205 Compressed gas duct
202 Compressed gas distribution device
203 Anchoring cable float
204 Anchoring cable hook
207 Underwater robot, ROV
301 Ballast tank, empty
302 Ballast tank, full
401 Sliding attachment cable
402 Full flexible float attached to sliding cable
403 Empty flexible float attached to sliding cable
404 Passage orifice for sliding cable 401
405 Control device for locking system
406 Circuit connecting control device (405) and locking system
502 Empty ballast tank attached to sliding cable
503 Full ballast tank attached to sliding cable
601 PAP platform comprising a PAG platform
603 Fins
604 Thrusters
605 PAG platform integrated in PAP platform
606 Rail
701, 702 PAG platforms integrated in PAP platform
703 Anchoring cable for PAP platform comprising a plurality of PAG platforms
801 Stays
901 Upper lift pulley
902 Continuous lift cable
903, 904 Hooks fixed to a cable 902
905 Lower lift pulley
906 Lower tension weight
907 Anchoring cable winch
1101 Trolley driving or steering wheels
1102 Roller for diverting weight 135
1103 Sling fixed to weight 135
1301 Upper tension weight
1302 Return pulley for weight 1301
1303 Cable for winch 1304
1304 Winch for controlling depth of tension weight 1301
1305 Upper return pulley
1306 Drive pulley
1401, 1402 Hoists
1501 Thruster
1502 Hook positioning unit
1503 Cable connecting positioning unit 1502 to hook 105
1601 Fin for controlling rotary movements
1701, 1702 Hoists
1703 Beam joining hoists 1701 and 1702
1801, 1802 Upper pulley assemblies
1803, 1804 Drive pulley assemblies
1901 Tension float for cables 1904
1902 Return pulley for float 1901
1903 Return pulley fixed to bottom of the body of water
1904 Side cables for hooks 105
2001 Lower return pulley
2002 Assembly comprising motor/generator and gears
2003 Arrow indicating movement of cable elements shown in the figure
2004 Upper return pulleys
2005 Drive pulleys
2101 Spiral bevel gearbox
2102 Differential gear
2103 Electric motor/generator
2202 Cable element providing bearing point for beam 2201.
2203 Cable element providing bearing point for other end of beam 2201

The invention also concerns a method for storing and generating electrical energy in an aquatic or subaquatic environment, comprising the steps consisting of:

in generation mode, lowering a plurality of weights (135) into the bottom zone (126) with the assistance of a generator lift (100) connecting a PAG platform (101) supporting said main float lift positioned substantially below the surface to a bottom zone (126), such that the force exerted by the weights (135) allows the generator lift (100) to actuate a reversible motor (102) in electrical energy production mode and, in drive mode, to raise said weights back towards a depth located some tens of metres below the surface, with the assistance of the being in drive mode and ensuring drive of the generator lift (100).

It will be understood that the system for storing and generating electrical energy in an aquatic or subaquatic environment or according to the invention may also comprise the following elements or features:

anchoring cables for the PAP platforms arranged in the form of stays (801) and possibly incorporating sensors of the stress gauge type (8012).

the lower part of the generator lift can be connected to one or more return pulleys (905) placed on a support (1001) capable of moving on the bottom of the body of water with wheels, caterpillar tracks or any other mechanical means of locomotion.

the lower part of the generator lift is connected to one or more return pulleys (905) and is protected by one or more rollers (1102) arranged so as to divert the weights when said weights pass close to the lower return pulleys (905).

the generator lift (100) comprises an even number of hoists (1701), the pulley block of each of which is connected to one and the same hook (105) and has cables (104) running therethrough which have reversed strand winding directions between two successive hoists on the beam (1703).

the hooks (105) of the generator lift are connected to cables (1904) which are continuously tensioned by passing via one or more return pulleys (1903) fixed to the sea bottom and a return pulley (1902) fixed to a float (1901).

What is claimed is:

1. A system for use in an aquatic or subaquatic environment to store electrical energy from an electric grid when excess electrical energy is available at the electric grid and to generate electrical energy to the electric grid when electrical energy is required at the electric grid, the system comprising:

a plurality of submerged weights;

an underwater weight attachment platform, wherein each of the submerged weights is removably attachable to the weight attachment platform by a remotely operated vehicle (ROV), and wherein the weight attachment platform is anchored to a bottom of a body of water and comprises a plurality of floats each with an individually adjustable variable volume of gas, thereby permitting adjustment of the buoyancy of said weight attachment platform as a function of a number of the submerged weights attached thereto;

a generator lift capable of cooperating with each of the submerged weights such that each of the submerged weights is removably attachable to the generator lift, wherein the generator lift is arranged to:

in a generation mode, allow said weights, when attached to the generator lift, to descend from the weight attachment platform to a bottom zone of the body of water; and in a drive mode, raise said weights, when attached to the generator lift, from the bottom zone of the body of water up towards the weight attachment platform;

an underwater generator lift platform capable of supporting, below a surface of the body of water, the generator lift when the generator lift is loaded or unloaded with one or more of the plurality of submerged weights; said generator lift platform comprising floating elements and anchoring cables for anchoring the generator lift platform to the bottom of the body of water, which allows the generator lift platform to be stabilized at a given depth; and a reversible motor capable of cooperating with the generator lift to:

in the generation mode, produce electrical energy due to the action of one or more of the plurality of submerged weights as they descend from the weight attachment platform to the bottom zone of the body of water; and in the drive mode, to actuate the generator lift to raise one or more of the plurality of submerged weights up from the bottom zone of the body of water towards the weight attachment platform.

2. The system of claim 1, wherein the reversible motor is borne by the generator lift platform supporting the generator lift and cooperates with an upper portion of the generator lift.

3. The system of claim 1, wherein the generator lift includes a pulley assembly actuating a cable between the generator lift platform and the bottom zone.

4. The system of claim 1, wherein the generator lift includes a pulley assembly configured to actuate a cable between the generator lift platform and the bottom zone, and wherein the pulley assembly comprises a surface pulley borne by the generator lift platform and a bottom pulley.

5. The system of claim 1, wherein the generator lift includes a pulley assembly actuating a cable between the generator lift platform and the bottom zone, wherein the pulley assembly comprises a surface pulley borne by the generator lift platform and a bottom pulley, and wherein the surface pulley cooperates mechanically with the reversible motor via a transmission.

6. The system of claim 1, wherein the generator lift includes a winch borne by the generator lift platform, a winch cable and at least one hook.

7. The system of claim 1, wherein the generator lift includes a winch borne by the generator lift platform, a winch cable and at least one hook, and wherein the winch cooperates mechanically with the reversible motor via a transmission.

8. The system of claim 1, wherein the weights are substantially elongate in shape.

9. The system of claim 1, wherein each of the floats of the weight attachment platform comprises a control system for managing fluid flow rates of gas in fluidic cooperation with an interior of the float and a compressor.

10. The system of claim 1, wherein the floats include a flexible material.

11. The system of claim 1, wherein the floats include a ballast tank configured to be filled with or emptied of water via an orifice which communicates between said ballast tank and an exterior of the system.

12. The system of claim 1, wherein the generator lift platform is a mobile element of the weight attachment platform and serves as an attachment support for the weights when in an upper position.

13. The system of claim 1, wherein the anchoring cables of the weight attachment platform are arranged in the form of stays having sensors.

14. The system of claim 1, wherein a lower part of the generator lift is connected to one or more return pulleys placed on a support cable capable of moving on the bottom of the body of water with wheels, caterpillar tracks or any other mechanical means of locomotion.

15. The system of claim 1, wherein a lower part of the generator lift is connected to one or more return pulleys and is protected by one or more rollers arranged so as to divert the weights when said weights pass close to the lower return pulleys.

16. The system of claim 3, wherein the cable of the generator lift is configured to be continuously tensioned via a mechanism comprising one or more return pulleys, and wherein the position of the pulleys varies by being fixed to a weight attached to a winch.

17. The system of claim 3, wherein rotary and transverse movements of hooks of the cable between the generator lift platform and the bottom zone are controlled by thrusters, mobile fins and measuring instruments including one or more of gyroscopes, compasses, cameras, depth gauges and sonar.

18. The system of claim 1, further comprising the ROV, wherein the ROV is configured to removably attach each of the weights to or from the generator lift at the weight attachment platform.

19. A method for use in an aquatic or subaquatic environment to store electrical energy from an electric grid when excess electrical energy is available at the electric grid and to generate electrical energy to the electric grid when electrical energy is required at the electric grid, the method comprising:

in a generation mode, lowering a plurality of weights from an underwater weight attachment platform to a bottom zone of a body of water, by a generator lift of a generator lift platform positioned substantially below a surface of the body of water, and generating electrical energy, by a reversible motor in an electrical energy production mode, based on a force exerted by the weights when lowering the weights from the weight attachment platform to the bottom zone of the body of water; and in a drive mode, raising said weights from the bottom zone of the body of water back towards the weight attachment platform, by the reversible motor actuating the generator lift in the drive mode, whereby the weights are positioned above the bottom zone of the body of water for subsequent lowering in connection with generating further electrical energy;

wherein the weight attachment platform is anchored to a bottom of the body of water and includes a plurality of floats to permit adjustment of a buoyancy of the weight attachment platform as a function of a number of weights attached thereto; and wherein the generator lift platform includes floating elements and anchoring cables for anchoring the generator lift platform to the bottom of the body of water to thereby stabilize the generator lift platform at a given depth.

20. The method of claim 19, further comprising removably attaching the weights to or from the generator lift at the weight attachment platform by a remotely operated vehicle.

\* \* \* \* \*